Feb. 9, 1965 O. W. FIX 3,169,165
INFRARED COUNTERMEASURE SYSTEM USING RADIAL
SHUTTER ARRAY FOR LIGHT MODULATION
Filed May 15, 1961
Fig-1
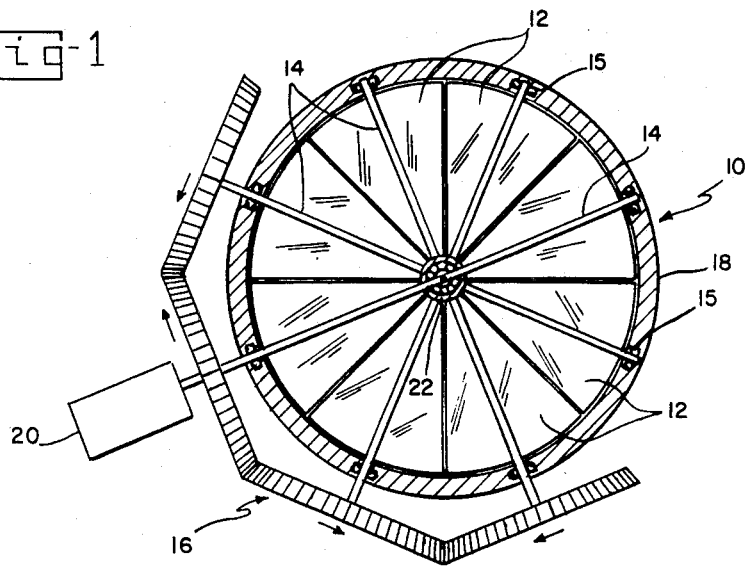
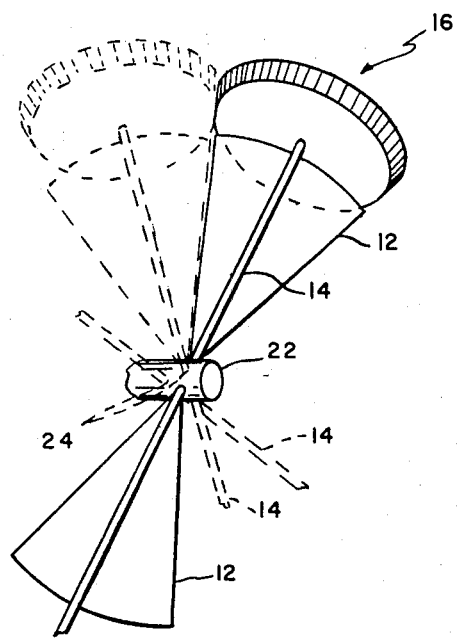
Fig-2
INVENTOR.
OLIVER W. FIX
BY
ATTORNEYS

United States Patent Office 3,169,165
Patented Feb. 9, 1965

3,169,165
INFRARED COUNTERMEASURE SYSTEM USING RADIAL SHUTTER ARRAY FOR LIGHT MODULATION
Oliver W. Fix, St. John, Wash. (602 Ocean View Blvd., Vandenberg A.F. Base, Calif.)
Filed May 15, 1961, Ser. No. 110,277
2 Claims. (Cl. 88—61)
(Granted under Title 35, U.S. Code (1952), sec. 266)

The invention described herein may be manufactured and used by or for the United States Government for governmental purposes without payment to me of any royalty thereon.

The invention relates to devices for modulating light, and more particularly to a shutter device which permits one hundred percent sinusoidal modulation of an infrared constant output source.

A countermeasures techniques against infrared seeking missiles is the scattering of infrared radiation downward from the potential aircraft target. Devices capable of producing a sinusoidal modulation of an infrared constant output source are known. The novel device of the present invention utilizes a plurality of pivotably mounted shutter blades to scatter infrared radiation in a manner which is superior to that known in the prior art.

A typical shutter device of the prior art uses the "stove damper" technique. A first disc is mounted in a fixed position in front of an infrared light source. A second disc is rotatably mounted on the opposite side of the first disc from the light source. Each of the discs has, for example, three equally spaced cutouts. The first disc is mounted on a bearing and rotated at that point by a motor drive means. A reinforcement band around the periphery of the rotatable disc is necessary to prevent failure at high speeds due to the large centrifugal force developed at the outer edge.

The disadvantages of the prior art device described are several. The device never passes more than half the total energy available. Half the total area is still blocked when the shutter openings are coincident. Additionally, the frequency of the blinking rate from the shutter is important in countermeasures. To obtain a given frequency from the prior art device the entire movable portion of the shutter must rotate at the desired frequency; for example, two cycles per second require a speed of two revolutions per second. The shutter must be large since infrared sources are large in size. The relatively large radius increases the chances of failure at high rotational speeds due to the centrifugal forces developed. Further, the device is limited to relatively low operating temperatures because fifty percent of all available energy is captured by the fixed shutter at all times while half of the remaining energy is captured by the rotating element. The structure tends to overheat, thus limiting the infrared source intensity.

It is an object of this invention to provide an improved shutter device which permits a one hundred percent sinusoidal modulation of a constant light source.

It is a further object of this invention to provide an improved shutter device having low centrifugal forces and a superior stress distribution which allows the use of high modulation frequencies.

It is a still further object of this invention to provide an improved shutter device which captures a minimum of heat energy from the infrared light source.

Other objects, novel features, and advantages of this invention, will appear more fully upon consideration of the embodiment illustrated in the accompanying drawings and hereinafter to be described.

In the drawings:
FIGURE 1 is an illustration of the novel shutter device of the invention partly in section, and
FIGURE 2 is a detailed perspective illustration of a pair of shutter blades mounted on a splined shaft of the shutter device of the invention.

Referring now to FIG. 1, a light modulating device according to the invention is generally referenced 10 and comprises an even-numbered plurality of sector-shaped shutter blades 12 radially mounted about a stationary center guide 22. Diametrically opposite shutters are angularly displaced from each other by 180° and each such pair of shutters is rigidly attached to a shaft 14 perpendicular to the longitudinal axis of guide 22. The shafts 14 thus form a radial array in appearance similar to the spokes of a wheel and are journalled in bearings 15 carried by a fixed annular bearing support member 18 concentric with the axis of guide 22. Substantially the center of each shaft extends with rotational clearance through one of a plurality of openings 24 (FIG. 2) provided in guide 22 and the center guide may, if desired, be provided with suitable bearings in which the shafts may find additional bearing support. The openings receiving the shafts are offset from each other longitudinally, that is, in tandem fashion, by a distance sufficient to allow the shafts to rotate simultaneously without interference. Corresponding ends of four of the shafts lie outside the circular area enclosed by member 18 and carry identical meshed gears to form a gear train 16, thereby rendering synchronous rotation of the shutters possible when motive power is supplied. Hence, a suitable drive member, herein schematically shown as a variable speed motor 20 is coupled in driving relation to the gear train so that as the driven shaft is turned the shutters rotate synchronously with an angular velocity proportional to the r.p.m. of the motor.

It will be obvious that as a result of the gearing arrangement shutters adjacent to each other will rotate in opposite directions.

Let it be assumed that a source of radiation is directing a beam toward the light modulating device shown in FIG. 1. Through one complete revolution of each shutter 12, first one side of the shutter and then the opposite side is exposed to the radiation at a regularly recurring rate. Radiation which the shutter device is intended to modulate is blocked from passing when the shutters take the positions shown in FIG. 1 but when the shutters under the power of motor 20 are turned to where their plane surfaces lie parallel to the path of the incident beam minimum attenuation of the beam will be experienced. It will thus be appreciated that 100% sinusoidal modulation of the radiation delivered by a radiation source is achieved since the shutter allows substantially all of the radiation to pass in the open position.

Prominent among the desirable features of the invention is that periodic thermal relief for the shutters is obtained. This follows from alternately exposing the sides of the shutter to radiation which allows each side to cool during the time taken for 180° of rotation. Because of this latter feature the modulating device of the invention may be employed at higher transmitting power levels with less likelihood of thermal deterioration.

FIG. 2 shows the manner of arranging the shafts 14 relative to guide 22 to avoid interference of the shafts during rotation.

By controlling the speed of the motor 20, various frequencies of modulated sine waves can be imposed on the light or radiation source positioned behind the shutter device. The shutter blades rotate about their own centerline. This basically strong structure with excellent distribution of weight and forces permits very high rotational speeds and modulation frequencies.

While a specific embodiment of the invention has been described in detail by way of illustration, it is understood that the invention is defined solely by the appended claims and embraces any embodiment falling within the terms and spirit thereof.

I claim:

1. A light modulating device comprising an even-numbered plurality of sector-shaped shutters radially mounted about a central axis in such manner to form pairs of diametrically opposite shutters, a plurality of journalled shafts perpendicularly intercepting said central axis and each of the shafts being connected to diametrically opposite shutters, a fixed annular member concentric with the central axis and disposed in spaced relation to the peripheral boundary formed by the curved edges of the shutters, bearings in said annular member in which the shafts are rotatably mounted, an even-number of the shafts having corresponding ends extending outwardly of the outer periphery of said annular member, meshed gears mounted on said corresponding ends of the shafts for synchronous rotation, and motive means connected in driving relation with one of the gears for causing synchronous 360° rotation of the shutters.

2. A light modulating device comprising an even-numbered plurality of sector-shaped shutters radially mounted about a centrally positioned elongate guide member whose elongated axis is perpendicular to the radial direction, said shutters being arranged in diametrically opposite pairs, a plurality of radially directed shafts extending through said central guide and each shaft being connected to a diametrically opposite pair of the shutters, an annular member mounted fixedly concentric with the axis of said guide member and being disposed outwardly of the curved edges of the shutters, means in the annular member for rotatably mounting each of the shafts, the corresponding ends of an even number of the shafts extending radially beyond the outer periphery of the annular member, meshed gears connected for synchonous rotation coupled to said corresponding ends of the shafts, and variable speed driving means connected in driving relation to one of the gear for synchronously rotating the shutters to position in which first one side and then the other side of each shutter is exposed to incident rotation.

References Cited by the Examiner
UNITED STATES PATENTS

| | | | |
|---|---|---|---|
| 2,481,083 | 9/49 | Chew | 88—61 |
| 2,763,177 | 9/56 | Taylor | 88—61 |
| 2,995,997 | 8/61 | Nieuwenhoven | 88—61 |
| 3,024,700 | 3/62 | McClellan | 88—61 |
| 3,049,962 | 8/61 | Denecke | 88—61 |

JEWELL H. PEDERSEN, *Primary Examiner.*

EMIL G. ANDERSON, *Examiner.*